United States Patent
Kennedy

(10) Patent No.: US 10,577,958 B2
(45) Date of Patent: Mar. 3, 2020

(54) FACE SEAL ASSEMBLY FOR VARIABLE TURBINE GEOMETRY TURBOCHARGER

(71) Applicant: BorgWarner Inc., Auburn Hills, MI (US)

(72) Inventor: Donald M. Kennedy, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/484,939

(22) Filed: Apr. 11, 2017

(65) Prior Publication Data

US 2018/0291757 A1    Oct. 11, 2018

(51) Int. Cl.
*F01D 11/00*    (2006.01)
*F02B 37/24*    (2006.01)
(Continued)

(52) U.S. Cl.
CPC .............. *F01D 11/003* (2013.01); *F01D 5/04* (2013.01); *F01D 9/041* (2013.01); *F01D 17/16* (2013.01);
(Continued)

(58) Field of Classification Search
CPC ...... F16J 15/186; F16J 15/3452; F16J 15/164; F16J 15/52; F01D 9/02; F01D 9/041;
(Continued)

(56) References Cited

U.S. PATENT DOCUMENTS 2,586,739 A * 2/1952 Summers ................. F16J 15/38
277/362
4,343,479 A * 8/1982 Fukuoka .............. F16J 15/3496
277/404
(Continued)

FOREIGN PATENT DOCUMENTS

DE     10 2008 063212 A1    7/2017
JP     2000-193044     * 12/1998    ............. F16G 13/02
(Continued)

OTHER PUBLICATIONS

International Search Report related to Application No. PCT/US2018/026814 dated Jun. 26, 2018.

*Primary Examiner* — Phutthiwat Wongwian
*Assistant Examiner* — Edward Bushard
(74) *Attorney, Agent, or Firm* — Miller, Matthias & Hull LLP

(57) ABSTRACT

A variable turbine geometry (VTG) turbocharger is disclosed. The VTG turbocharger may comprise a turbine section, a bearing section, and an actuation pivot shaft (APS) having a bearing side in the bearing section and a pressure side in the turbine section. The VTG turbocharger may further comprise a bushing surrounding the APS and extending from a first end at the pressure side to a second end at the bearing side. In addition, the VTG turbocharger may further comprise a face seal assembly including a cup spring and a composite ring seal circumscribing the APS at the pressure side, with the cup spring forming a face seal with the first end of the bushing. The face seal assembly may (Continued)

further include a spring circumscribing the APS at the bearing side and engaging the second end of the bushing.

19 Claims, 7 Drawing Sheets

(51) Int. Cl.
    *F01D 5/04*     (2006.01)
    *F01D 25/16*     (2006.01)
    *F01D 9/04*     (2006.01)
    *F01D 17/16*     (2006.01)

(52) U.S. Cl.
    CPC .............. *F01D 25/16* (2013.01); *F02B 37/24* (2013.01); *F05D 2220/40* (2013.01); *F05D 2230/60* (2013.01); *F05D 2260/52* (2013.01); *F05D 2260/57* (2013.01)

(58) Field of Classification Search
    CPC ...... F01D 17/16; F01D 11/003; F02F 11/007; F23J 2213/204; F16F 1/025; F16H 57/0472; F16C 2202/52; F16C 33/04; F02M 26/04; F02B 37/24
    USPC .......................................................... 60/602
    See application file for complete search history.

(56) References Cited

U.S. PATENT DOCUMENTS

| | | | | |
|---|---|---|---|---|
| 4,363,600 | A * | 12/1982 | Thebert | F01D 17/162 415/140 |
| 4,420,160 | A | 12/1983 | Laham | |
| 4,427,204 | A * | 1/1984 | Alley | F16J 15/32 277/372 |
| 4,659,295 | A * | 4/1987 | Burdette | F01D 17/165 415/164 |
| 5,787,791 | A * | 8/1998 | Vertanen | F15B 15/24 277/362 |
| 6,599,087 | B2 * | 7/2003 | Arnold | F01D 11/003 415/163 |
| 7,351,042 | B2 * | 4/2008 | Jinnai | F01D 17/165 415/134 |
| 7,644,583 | B2 * | 1/2010 | Leavesley | F02B 37/183 415/156 |
| H2289 | H * | 2/2014 | Kennedy | 384/481 |
| 9,163,624 | B2 | 10/2015 | Moore et al. | |
| 9,388,732 | B2 * | 7/2016 | House | F01D 11/003 |
| 9,488,181 | B2 | 11/2016 | Parodi et al. | |
| 9,488,182 | B2 * | 11/2016 | Ward | F01D 17/165 |
| 2002/0098080 | A1 * | 7/2002 | Arnold | F01D 11/003 415/163 |
| 2002/0113397 | A1 * | 8/2002 | Svensson | B60G 11/16 280/124.155 |
| 2010/0270098 | A1 * | 10/2010 | Buell | F01N 13/001 180/225 |
| 2016/0130967 | A1 * | 5/2016 | Kelly | F01D 11/003 415/174.5 |
| 2016/0237838 | A1 * | 8/2016 | Kennedy | F01D 11/003 |
| 2017/0089467 | A1 * | 3/2017 | Young | F16J 15/3412 |
| 2017/0248070 | A1 * | 8/2017 | Heddy, III | F01D 17/165 |

FOREIGN PATENT DOCUMENTS

| | | |
|---|---|---|
| WO | WO 2012/131997 A1 | 10/2012 |
| WO | WO 2015/061241 A1 | 4/2015 |

\* cited by examiner

FACE SEAL ASSEMBLY FOR VARIABLE TURBINE GEOMETRY TURBOCHARGER

TECHNICAL FIELD

The present disclosure generally relates to turbochargers and, more specifically, to face seal assemblies that seal leakage of exhaust gases from variable turbine geometry (VTG) turbochargers.

BACKGROUND

Turbochargers are used in numerous applications such as automotive, marine, and aerospace applications. Turbochargers may provide a pressure increase (or boost) in the intake air over atmospheric pressures to increase the power output of the engine. A turbocharger may include a turbine section having a turbine wheel, a compressor section having a compressor wheel, and a bearing section housing a shaft that interconnects the turbine wheel and the compressor wheel. The turbine wheel may extract energy from exhaust gases to drive the compressor via the interconnecting shaft, while the compressor wheel may increase the pressure of intake air for delivery to the combustion chamber of the engine.

Some turbocharger designs may include a wastegate or a valve that opens to divert exhaust gases away from the turbine wheel when the turbocharger boost reaches a pressure threshold. In contrast, variable turbine geometry (VTG) turbochargers may not require a wastegate. Instead, in VTG turbochargers, the turbine output may be regulated with guide vanes that surround the turbine wheel at the turbine inlet. The guide vanes may open and close to control the flow of exhaust gases onto the turbine wheel in order to maximize turbocharger boost under varying operating conditions.

A pneumatic or electronic actuator may control opening and closing of the guide vanes via an actuation pivot shaft (APS) housed in the bearing section. The APS may be received in a bushing held a bore of the bearing section, with a head end of the APS extending into the turbine section for exposure to high temperature and high pressure exhaust gases. A pre-defined clearance between the bushing and the APS may exist to allow tilting and rotation of the APS in the bushing, and to prevent binding of the APS in the bushing caused by thermal growth and/or corrosion build-up. However, the clearance between the APS and the bushing may provide a flow path for fugitive exhaust gases that have not been treated by the exhaust aftertreatment system to escape from the turbine section into the atmosphere.

Current VTG turbochargers may include piston rings that partially obstruct the leakage of exhaust gases through clearances in the APS/bushing assembly. Development of more effective seals that completely eliminate exhaust gas leakage is challenging, however, due to the high temperature and corrosive environment of the APS/bushing assembly which requires sealing materials with high temperature capability and resistance to corrosion. In addition, suitable seals should have a service life that matches the service life of the vehicle, and should be flexible enough to permit tilting and rotation of the APS in the bushing. The latter requirement precludes the use of some rigid face seals that may become unseated as the shaft tilts relative to the bushing.

U.S. Pat. No. 7,644,583 discloses a variable nozzle turbocharger (VNT) having a control rod received in a bushing that is involved in actuating rotation of the turbine vanes. The control rod/bushing assembly includes washers on one end of the bushing, and a spring on the other end of the bushing to seal exhaust gas leakage therethrough. While effective, there is still a need for improved seal designs that seal leakage of exhaust gases through the APS/bushing interface in VTG turbochargers.

SUMMARY

In accordance with one aspect of the present disclosure, a variable turbine geometry (VTG) turbocharger is disclosed. The VTG turbocharger may comprise a turbine section having a turbine wheel and a plurality of guide vanes surrounding the turbine wheel. The plurality of guide vanes may be configured to regulate a flow of exhaust gases to the turbine wheel by opening and closing. The VTG turbocharger may further comprise a compressor section, a bearing section between the turbine section and the compressor section, and an actuation pivot shaft (APS) configured to mediate actuation of the opening and closing of the plurality of guide vanes. The APS may have a shaft portion extending through the bearing section, and a head end penetrating the turbine section. The VTG turbocharger may further comprise a bushing rotatably supporting the shaft portion of the APS with a clearance therebetween. The bushing may have a first end and a second end. In addition, the VTG turbocharger may further comprise a face seal assembly configured to seal a leakage of the exhaust gases through the clearance between the bushing and the APS. The face seal assembly may include a cup spring circumscribing the shaft portion near the head end and forming a face seal with the first end of the bushing. The face seal assembly may further include a composite ring seal circumscribing the shaft portion adjacent to the cup spring and forming a face seal with the cup spring and a mating structure. In addition, the face seal assembly may further include a spring circumscribing the shaft portion and engaging the second end of the bushing. The cup spring and the spring may be held in compression with the retaining structure.

In accordance with another aspect of the present disclosure, a variable turbine geometry (VTG) turbocharger is disclosed. The VTG turbocharger may comprise a turbine section having a turbine wheel and a plurality of guide vanes surrounding the turbine wheel. The guide vanes may be configured to regulate a flow of exhaust gases to the turbine wheel by opening and closing. The VTG turbocharger may further comprise a compressor section, a bearing section between the turbine section and the compressor section, and an actuation pivot shaft (APS) configured to mediate actuation of the opening and closing of the plurality of guide vanes. The APS may include a bearing side in the bearing section and a pressure side in the turbine section. The VTG turbocharger may further comprise a bushing rotatably supporting the APS with a clearance therebetween, and the bushing may extend from a first end at the pressure side to a second end at the bearing side. In addition, the VTG turbocharger may further comprise a face seal assembly configured to seal a leakage of the exhaust gases through the clearance between the bushing and the APS. The face seal assembly may include a cup spring and a composite ring seal circumscribing the APS at the pressure side. The cup spring may form a face seal with the first end of the bushing. The face seal assembly may further include a spring circumscribing the APS at the bearing side and engaging the second end of the bushing.

In accordance with another aspect of the present disclosure, a method of assembling a face seal assembly of a variable turbine geometry (VTG) turbocharger is disclosed.

The face seal assembly may be configured to seal a leakage of exhaust gases between an actuation pivot shaft (APS) and a bushing rotatably supporting the APS. The APS may have a shaft portion and a head end. The method may comprise assembling a composite ring seal on the shaft portion of the APS near the head end and adjacent to a mating structure, inserting a cup spring over the shaft portion of the APS adjacent to the composite ring seal, and installing the shaft portion of the APS in the bushing so that a first end of the bushing faces the cup spring. The method may further comprise assembling a spring on the shaft portion of the APS adjacent to a second end of the bushing, and fastening a retaining structure on the shaft portion of the APS adjacent to the spring so that the retaining structure engages the spring. The fastening may form face seals between the first end of the bushing and the cup spring, between the cup spring and the composite ring seal.

These and other aspects and features of the present disclosure will be more readily understood when read in conjunction with the accompanying drawings.

DETAILED DESCRIPTION

Figure 1:
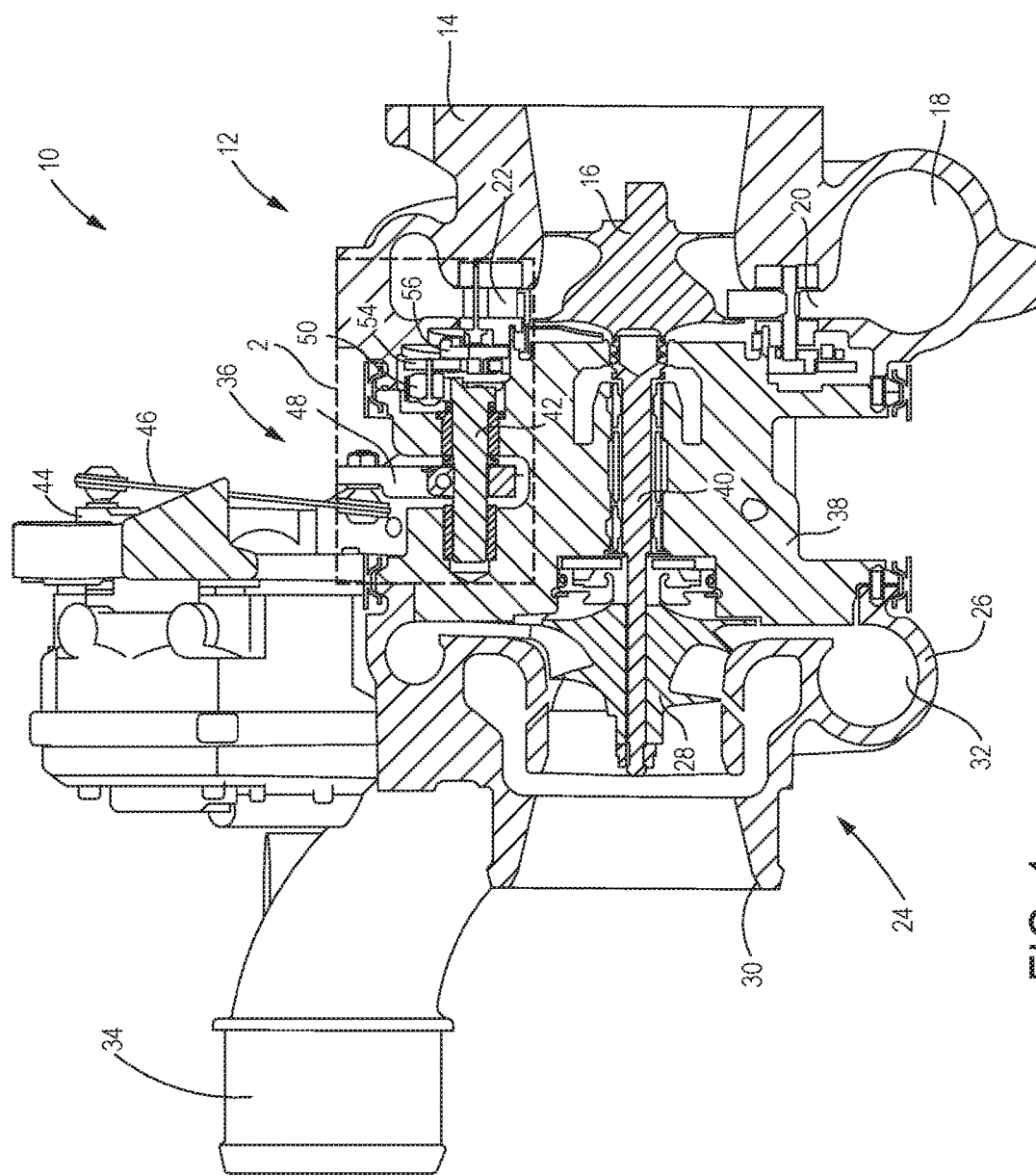
FIG. 1 is a cross-sectional view of a variable turbine geometry (VTG) turbocharger having a face seal assembly for sealing leakage of exhaust gases between an actuation pivot shaft and a bushing, constructed in accordance with the present disclosure.

Referring now to the drawings, and with specific reference to FIG. 1, a variable turbine geometry (VTG) turbocharger 10 is shown. As will be apparent to those skilled in the art, the VTG turbocharger 10 may operate by forcing more intake air into a combustion chamber of an internal combustion engine, allowing increased engine efficiency and power output. The turbocharger 10 may be a component of an automotive vehicle, although it may be used in other applications as well such as, but not limited to, marine or aircraft applications.

The VTG turbocharger 10 may include a turbine section 12 having a turbine housing 14 enclosing a turbine wheel 16. The turbine housing 14 may also define a volute 18 through which exhaust gases from the engine are channeled to the turbine wheel 16 via a throat 20. At the throat 20 of the volute 18 may be a plurality of guide vanes 22 that surround the turbine wheel 16 and regulate a flow of the exhaust gases to the turbine wheel 16 by opening and closing by various angles. The VTG turbocharger 10 may further comprise a compressor section 24 having a compressor housing 26 enclosing a compressor wheel 28 and defining an air inlet 30, a diffuser section 32, and a compressor outlet 34. Between the turbine section 12 and the compressor section 24 may be a bearing section 36 having a bearing housing 38 that encloses a shaft 40 interconnecting the turbine wheel 16 and the compressor wheel 28.

Exhaust gases may enter the turbine section 12 through a turbine inlet and may flow to the turbine wheel 16 via the volute 18 and the throat 20, causing the turbine wheel 16 to rotate. Rotation of the turbine wheel 16 may, in turn, drive the rotation of the compressor wheel 28 via the interconnecting shaft 40. Rotation of the compressor wheel 28 may increase the velocity of the intake air, and the high velocity air may be expelled into the diffuser section 32 for delivery to the combustion chamber of the internal combustion engine through the outlet 34.

The output of the turbocharger 10 under different operating conditions may be regulated by selective opening and closing of the guide vanes 22 of the turbine section 12. Actuation of the opening and closing of the guide vanes 22 may be mediated by an actuation pivot shaft (APS) 42 partially housed in the bearing section 36 (also see FIG. 2). More specifically, a pneumatic or an electronic actuator 44 may drive the movement of an intermediate linkage 46 that is connected at one end to the actuator 44 and at the other end to a lever 48 assembled on the APS 42. The intermediate linkage 46 may then drive the movement of the lever 48, and the lever 48 may drive the rotation of the APS 42 which, in turn, may drive the movement of a block/pin assembly 50 engaged with a head 52 of the APS (also see FIG. 2). The block/pin assembly 50 may then drive the movement of an adjustment ring 54 that subsequently adjusts the angle of the guide vanes 22 via a vane lever 56. Accordingly, torque may be transmitted from the actuator 44 to the guide vanes 22 via the APS 42.

Figure 2:
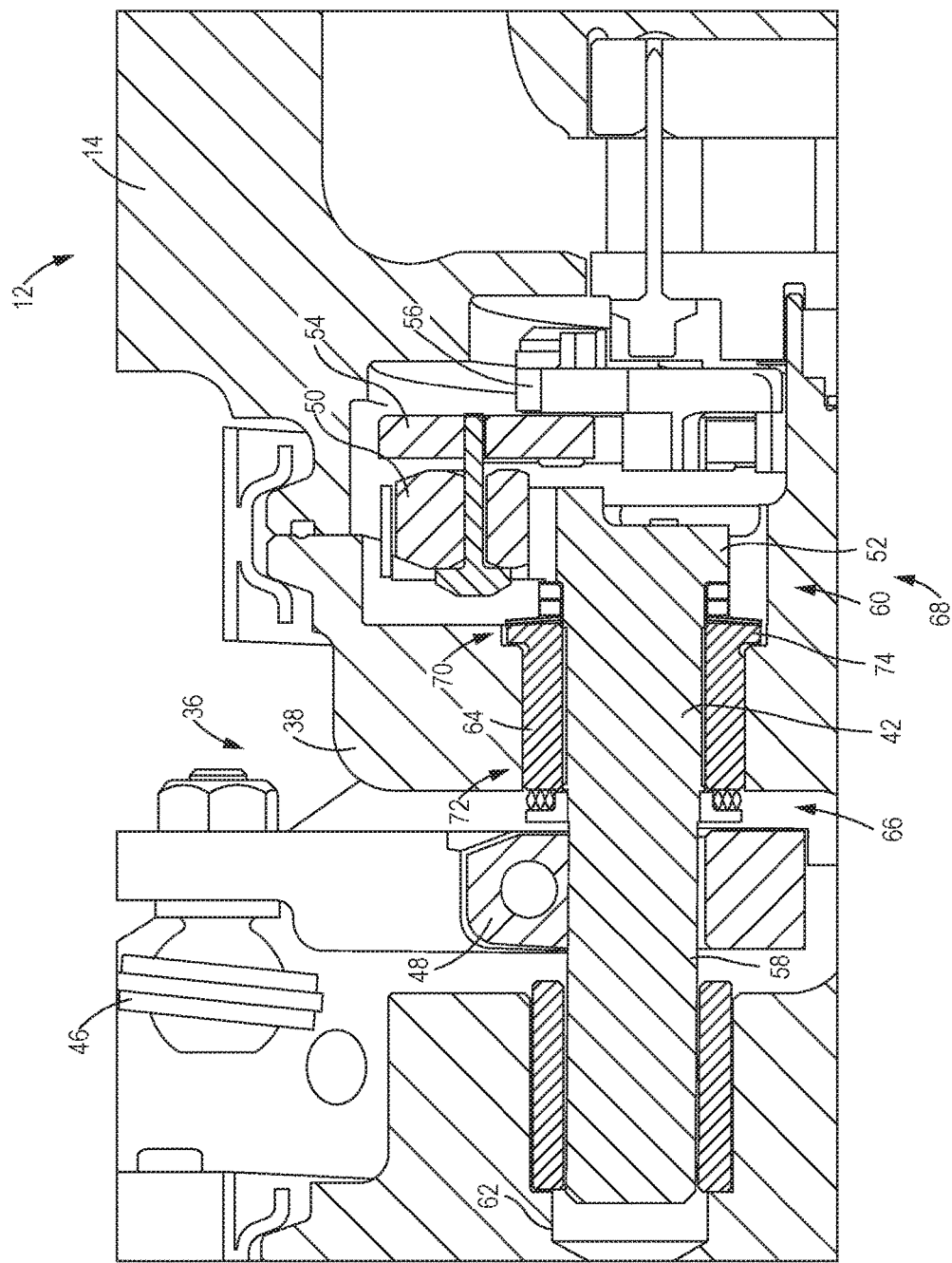
FIG. 2 is an expanded view of detail 2 of FIG. 1, constructed in accordance with the present disclosure.

Referring to FIG. 2, the APS 42 may include a shaft portion 58 and a head end 60 having the head 52. The shaft portion 58 of the APS 42 may extend through a bore 62 of the bearing housing 38, and may be rotatably supported by at least one bushing 64. The bushing 64 may support the APS 42 with a clearance therebetween to allow rotation and tilting of the APS 42 within the bushing 64. The head end 60 of the APS 42 may penetrate the turbine section 12 and, thus, may be exposed to hot exhaust gases in the turbine section 12. As such, the APS 42 may have a bearing side 66 exposed to cooler ambient air in the bearing section 36, and a pressure side 68 at the head end 60 exposed to higher pressure and higher temperature exhaust gases. The bushing 64 may have a first end 70 oriented toward the pressure side 68 of the APS 42, and a second end 72 oriented toward the bearing side 66 of the APS 42. In one arrangement, the first end 70 of the bushing 64 may be at a head 74 of the bushing 64.

Figure 3:
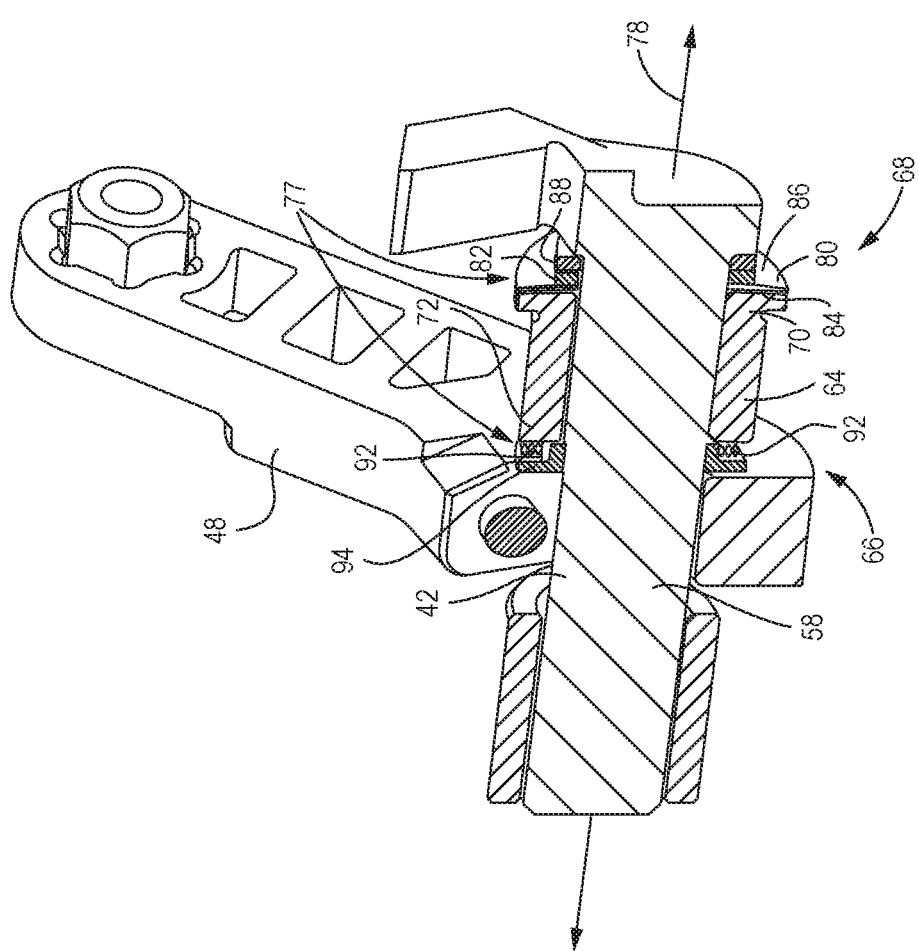
FIG. 3 is perspective a cross-sectional view of the face seal assembly, constructed in accordance with the present disclosure.
Figure 4:
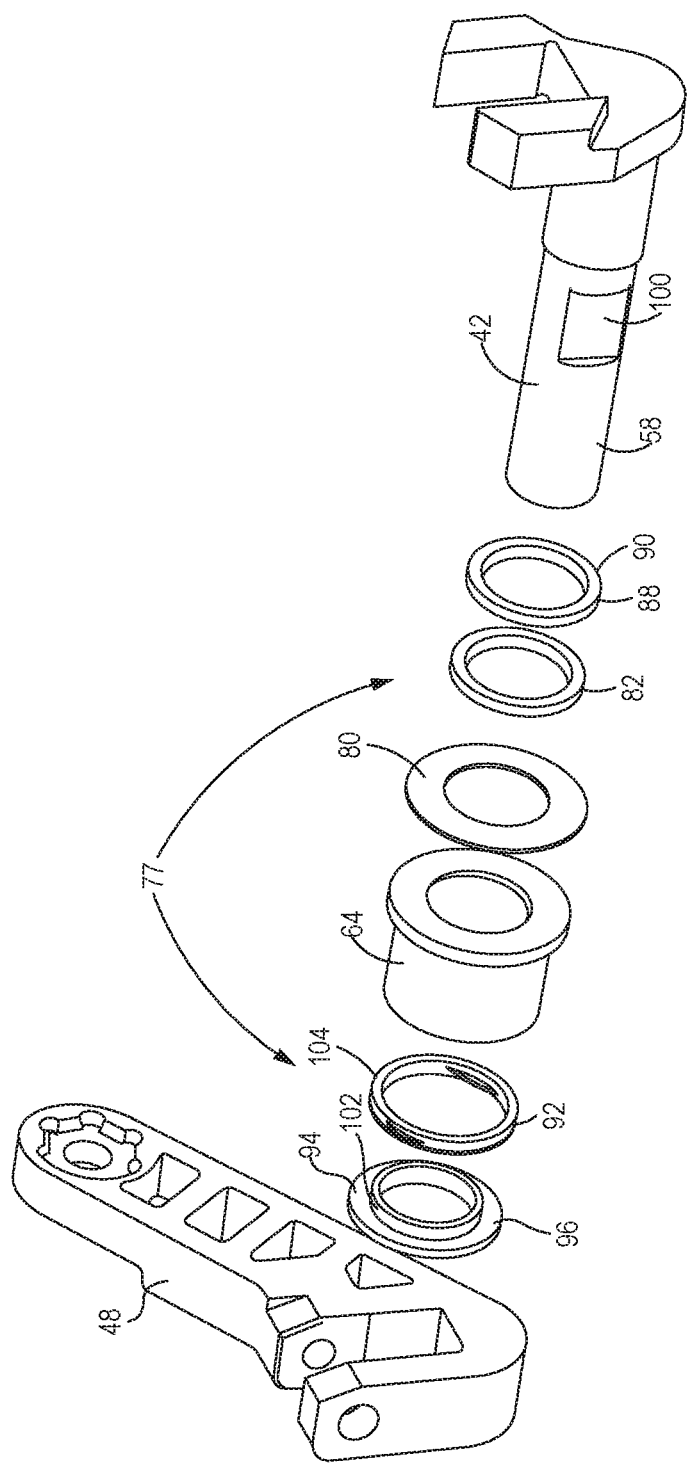
FIG. 4 is an exploded view of the face seal assembly, constructed in accordance with the present disclosure.

Referring now to FIGS. 3-4, the turbocharger 10 may further include a face seal assembly 77 assembled with the APS 42 and the bushing 64 to seal leakage of exhaust gases through the clearance between the APS 42 and the bushing 64. More specifically, the face seal assembly 77 may provide face seals that completely or nearly completely obstruct the flow of exhaust gases from the turbine section 12 to the external environment through the APS 42/bushing 64 assembly. As used herein, a "face seal" is a seal in which the sealing surfaces are perpendicular or substantially perpendicular to a longitudinal axis 78 of the APS 42.

At the pressure side 68, the face seal assembly 77 may include a cup spring 80 and a composite ring seal 82 circumscribing the shaft portion 58. The cup spring 80 may form a face seal with both the first end 70 of the bushing 64 on one side, and with the composite ring seal 82 on the other side. In one arrangement, the cup spring 80 may include a concave (or inwardly sloping) face 84 that engages the first end 70 of the bushing 64, and a convex (or outwardly sloping) face 86 that engages the composite ring seal 82. However, in alternative configurations, the concave face 84 may engage the composite ring seal 82, and the convex face 86 may engage the first end 70 of the bushing 64. The composite ring seal 82 may be positioned between the cup spring 80 and a mating structure 88, and may form a face seal with both the cup spring 80 on one side and the mating structure 88 on the other side. In the embodiment of FIGS. 2-4, the mating structure 88 is a mating ring 90 that circumscribes the shaft portion 58 between the composite ring seal 82 and the head 52 of the APS 42. The cup spring 80 and the composite ring seal 82 may not form an interference fit with the shaft portion 58, such that the cup spring 80 and the composite ring seal 82 may be free to rotate with relative to the shaft portion 58. In contrast, the mating ring 90 may form an interference fit with the outer diameter of the shaft portion 58.

At the bearing side 66, the face seal assembly 77 may include a spring 92 that engages the second end 72 of the bushing 64. In addition, a retaining structure 94 may engage the spring 92 at the bearing side 66 to hold the spring 92 and the cup spring 80 in partial compression and provide a spring force. In one embodiment, the retaining structure 94 is a retaining ring 96 that circumscribes the shaft portion 58 adjacent to the spring 92 (see FIG. 4). For instance, the retaining ring 96 may be used as the retaining structure 94 when the lever 48 is a pinch-style lever 98 that engages an engaging feature 100 at a defined location along the shaft portion 58 (see FIG. 4). The retaining ring 96 may have a central flange 102 on one face that may serve to radially locate the spring 92 with respect to the shaft portion 58. In other arrangements, the retaining ring 96 may lack the central flange 102 so that the spring 92 is not radially located or rests directly on the outer diameter of the shaft portion 58. Advantageously, the spring 92 may provide the face seal assembly 77 with a consistent seating load to account for tolerances and wear of the components of the assembly 77. In one arrangement, the spring 92 may be a wave spring 104, as will be apparent to those with ordinary skill in the art. In other arrangements, the spring 92 may be other types of springs apparent to those with ordinary skill in the art such as, but not limited to, a compression spring, a tension spring, or a torsion spring.

The face seal assembly 77 may preserve the ability of the APS 42 to tilt, rotate, and slide axially with respect to the bushing 64. In particular, the cup-spring 80 may be flexible in the radial direction, and may maintain a seal with the bushing 64 and the composite ring seal 82 as the APS 42 tilts radially. The cup spring 80 may also be flexible in the axial direction, and may compress vertically while maintaining a seal when pressure is applied on the APS 42 from the pressure side 68 or the bearing side 66. Further, as force is applied on the APS 42 from the pressure side 68 or the bearing side 66, the seating pressure of the spring 92 may counteract that force proportionally to keep the cup spring 80 and the composite ring seal 82 seated and strengthen the seal. In this regard, the face seal assembly 77 may be "self-energizing". In addition, the face seal assembly 77 may completely or nearly completely seal the leakage of exhaust gases through the APS 42/bushing 64 interface, as opposed to prior art seals that may only reduce exhaust gas leakage by a fraction. Further, the components of the face seal assembly 77 may be robust and exhibit minimal wear in the high temperature (e.g., about 300° C. to about 600° C.) and corrosive environment of the APS 42.

The cup spring 80 may be formed from a high temperature capable and corrosion resistant metallic material such as, but not limited to, a nickel alloy (e.g., Inconel®, Inconel® 718), a cobalt alloy, or stainless steel. The composite ring seal 82 may be a wear resistant and low friction composite material such as, but not limited to, a graphite composite or a carbon and graphite composite. Furthermore, the spring 92 may be formed from a metallic material such as stainless steel, although it may also be formed from a nickel alloy or a cobalt alloy under higher temperature conditions. In addition, the mating ring 90 may also be formed from a metallic material, such as stainless steel.

Figure 5:
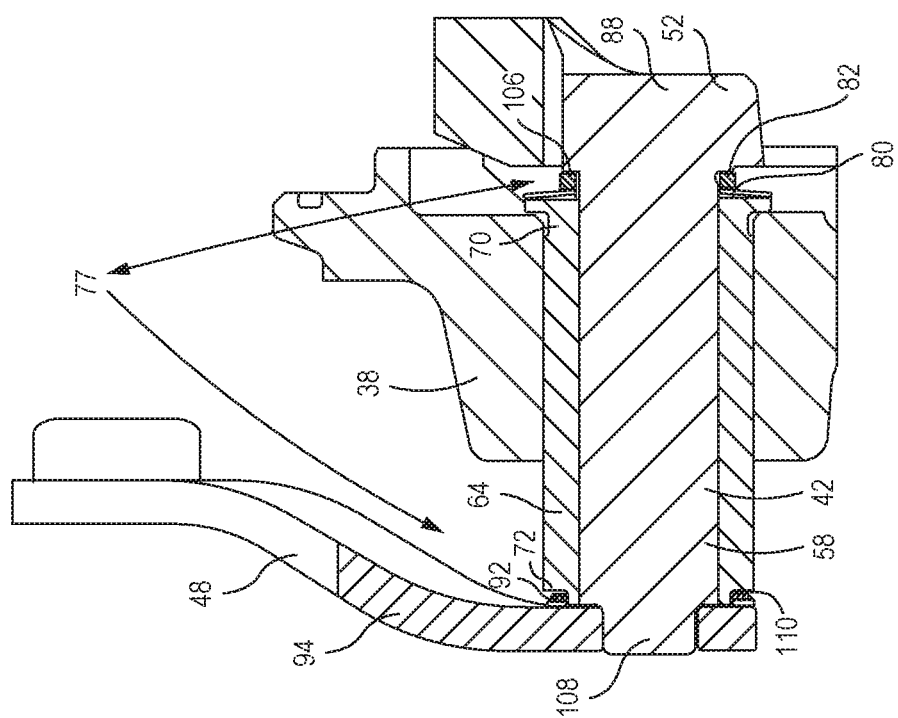
FIG. 5 is a cross-sectional view of a face seal assembly similar to FIG. 3, but lacking a mating ring and a retaining ring, constructed in accordance with the present disclosure.
Figure 6:
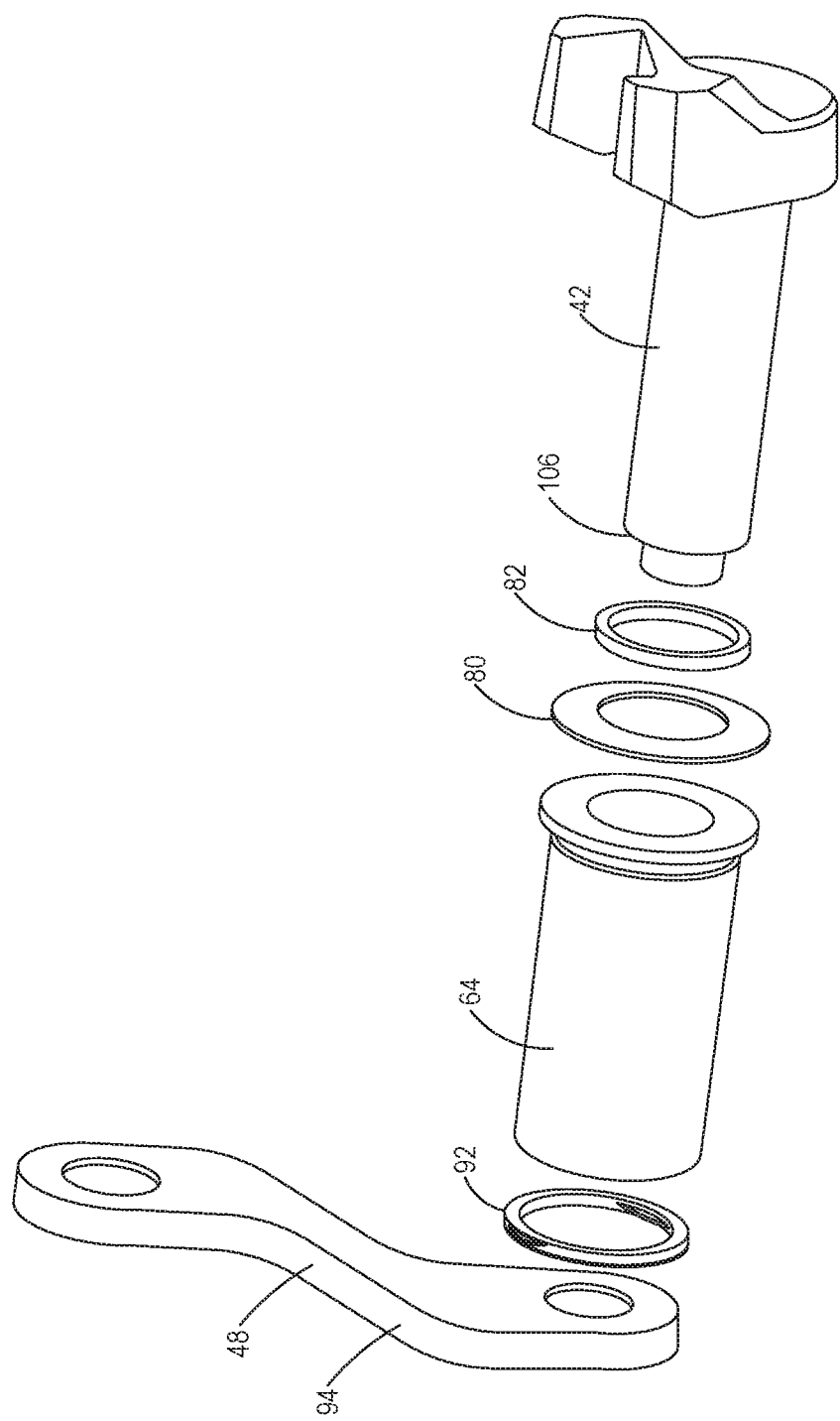
FIG. 6 is an exploded view of the face seal assembly of FIG. 5, constructed in accordance with the present disclosure.

An alternative embodiment of the face seal assembly 77 is shown in FIGS. 5-6. In this arrangement, the mating structure 88 is provided by the head 52 of the APS 42 rather than the mating ring 90 as in FIGS. 2-4. That is, the head 52 of the APS 42 in this embodiment includes a mating surface 106 that circumscribes the shaft portion 58 at the pressure side 68 and forms a face seal with the composite ring seal 82. In addition, the retaining structure 94 that compresses the spring 92 is the lever 48 rather than the retaining ring 96. In this arrangement, the lever 48 may be press-fit over a reduced diameter section 108 of the shaft portion 58 such that the lever 48 engages the spring 92 and holds the spring 92 and the cup spring 80 in compression. The second end 72 of the bushing 64 may also include a recess 110 with a reduced outer diameter that serves to receive the spring 92 and radially locate the spring 92 with respect to the shaft portion 58 (see FIG. 5). In other arrangements, however, the bushing 64 may lack the recess 110, the spring 92 may not be radially located with respect to the shaft portion 58, and/or the spring 98 may rest directly on the outer diameter of the shaft portion 58. All other features and components of the face seal assembly 77 of FIGS. 5-6 are the same as those described above in connection with FIGS. 1-4.

It is further noted here that the face seal assembly 77 disclosed herein may also be applied to seal leakage of exhaust gases in wastegate turbochargers, as will be appreciated by those skilled in the art. More particularly, the face seal assembly 77 of the present disclosure may be used to seal leakage of exhaust gases through clearances between the wastegate control shaft and the bushing that surrounds the control shaft.

INDUSTRIAL APPLICABILITY

In general, the teachings of the present disclosure may find broad applicability in many industries including, but not limited to, automotive, marine, aerospace, and transportation industries. More specifically, the teachings of the present disclosure may find applicability in any industry having vehicles or machines that include VTG turbochargers or wastegate turbochargers.

Figure 7:
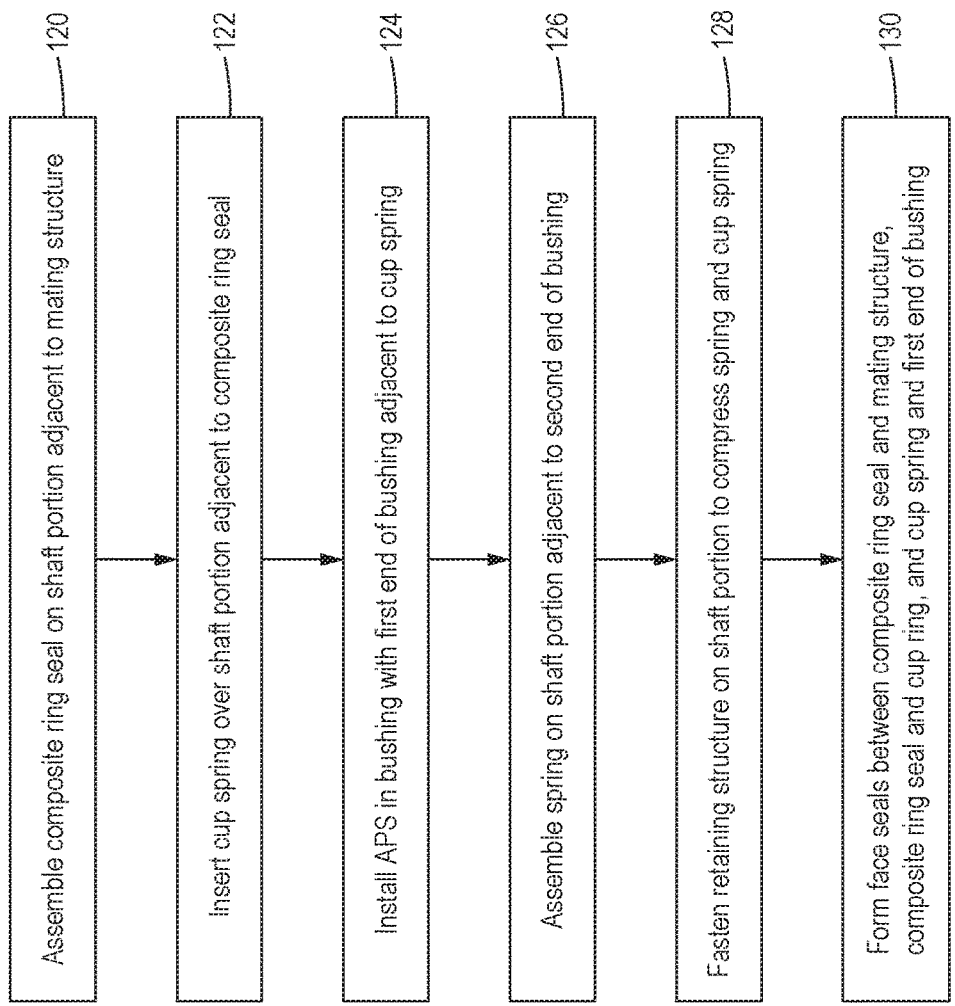
FIG. 7 is a flowchart of a series of steps that may be involved in assembling the face seal assembly, in accordance with a method of the present disclosure.

Turning to FIG. 7, a method that may be used to assemble the face seal assembly 77 is shown. At a first block 120, the composite ring seal 82 may be assembled on the shaft portion 58 of the APS 42 at the pressure side 68 adjacent to the mating structure 88 (e.g., the mating ring 90 or the head 52 of the APS 42). The cup spring 80 may then be inserted over the shaft portion 58 adjacent to the composite ring seal 82 according to a next block 122. At a next block 124, the APS 42 may be installed in the bushing 64 by inserting the APS 42 in the bushing 64 so that the first end 70 of the bushing 64 is adjacent to the cup spring 80. The block 124 may be carried out while the bushing 64 is held in the bore 62 of the bearing section 36.

According to a next block 126, the spring 92 may be assembled on the shaft portion 58 adjacent to the second end 72 of the bushing 64, with the spring 92 circumscribing the shaft portion 58. For instance, the spring 92 may be placed adjacent to the second end 72 of the bushing 64 (see FIGS. 2-4), or it may be placed in the recess 110 of the bushing 64 at the second end 72 (see FIGS. 5-6). At a block 128, the retaining structure 94 may be fastened on the shaft portion 58 adjacent to the spring 92 so that the retaining structure 94 engages the spring 92 and partially compresses the spring 92 and the cup spring 80. As explained above, the retaining structure 94 may be the retaining ring 96 (see FIGS. 2-4) or the lever 48 (see FIGS. 5-6), depending on how the lever 48 is assembled with the APS 42. For instance, the lever 48 may be press-fit on the shaft portion 58, although it may be fastened on the shaft portion 58 by other methods as well such as, but not limited to, welding, swaging, peening, pinning, or mechanical fastening. With the retaining structure 94 assembled and the springs 92 and 80 held in compression, the face seals of the face seal assembly 77 may be formed (block 130). That is, press-fitting the retaining structure on the shaft portion 58 may press the components at the pressure side 68 together to form the face seals between the composite ring seal 82 and the mating structure 88, between the composite ring seal 82 and the cup spring 80, and between the cup spring 80 and the first end 70 of the bushing 64.

The face seal assembly of the present disclosure includes a cup spring and a composite ring seal that form face seals at the pressure side of the APS. The face seal assembly also includes a spring at the bearing side of the APS that provides a consistent seating pressure that accommodates wear of the seal assembly components. Compared to piston seals of the prior art which only partially reduce exhaust gas leakage, the face seal assembly disclosed herein eliminates or nearly eliminates leakage of fugitive exhaust gases to the atmosphere through the APS/bushing assembly. As such, the face seal assembly may reduce emissions of pollutants into the atmosphere as such fugitive exhaust gases have not been treated by the exhaust aftertreatment system. In addition, the face seal assembly disclosed herein may have an extended service life as the components of the face seal assembly are formed from materials that are robust enough to withstand the high temperature and corrosive environment at the APS with minimal wear. Furthermore, the face seal assembly is flexible enough to accommodate thermal expansion and contraction of the APS/bushing components as well as tilting and rotation of the APS in the bushing, without compromising the strength of the face seal. By virtue of the spring on the bearing side, the face seal assembly disclosed herein is "self-energizing" in that the seating pressure of the spring increases proportionally to pressure applied from the turbine pressure side of the seal. Moreover, the face seal assembly disclosed herein may exhibit low parasitic torque on the APS.

What is claimed is:

1. A variable turbine geometry (VTG) turbocharger, comprising:
    a turbine section having a turbine wheel and a plurality of guide vanes surrounding the turbine wheel, the plurality of guide vanes being configured to regulate a flow of exhaust gases to the turbine wheel by opening and closing;
    a compressor section;
    a bearing section between the turbine section and the compressor section;
    an actuation pivot shaft (APS) connected to an actuator and configured to mediate actuation of the opening and closing of the plurality of guide vanes, the APS having a shaft portion extending through the bearing section, and a head end penetrating the turbine section;
    a bushing rotatably supporting the shaft portion of the APS with a clearance therebetween, the bushing having a first end and a second end, the first end being oriented toward the turbine section; and
    a face seal assembly configured to seal a leakage of the exhaust gases through the clearance between the bushing and the APS, the face seal assembly comprising:
        a cup spring circumscribing the shaft portion near the head end and forming a first face seal with the first end of the bushing, the cup spring extending from a radially inward edge to a radially outward edge, the radially outward edge of the cup spring contacting the first end of the bushing;
        a composite ring seal circumscribing the shaft portion adjacent to the cup spring and forming a second face seal with the cup spring and a mating structure, the cup spring and the composite ring seal relatively rotatable to the shaft portion and the bushing, the mating structure being one of a mating ring and a head of the APS;
        a spring circumscribing the shaft portion and engaging the second end of the bushing; and
        a retaining structure holding the cup spring and the spring in compression, the retaining structure being one of a retaining ring and a lever assembled on the shaft portion;
        wherein the lever is configured to transfer torque from the actuator to the APS.

2. The VTG turbocharger of claim 1, wherein the spring is a wave spring.

3. The VTG turbocharger of claim 1, wherein the mating structure is the head of the APS.

4. The VTG turbocharger of claim 1, wherein the mating structure is the mating ring, the mating ring being engaged between the composite ring seal and the head of the APS.

5. The VTG turbocharger of claim 4, wherein the mating structure forms an interference fit with the shaft portion.

6. The VTG turbocharger of claim 1, wherein the retaining structure is the lever.

7. The VTG turbocharger of claim 6, wherein the bushing includes a recess at the second end that receives the spring, and wherein the recess radially locates the spring with respect to the shaft portion.

8. The VTG turbocharger of claim 1, wherein the retaining structure is the retaining ring, the retaining ring circumscribing the shaft portion adjacent to the spring.

9. The VTG turbocharger of claim 8, wherein the retaining ring incudes a central flange that radially locates the spring with respect to the shaft portion.

10. The VTG turbocharger of claim 1, wherein the cup spring includes a concave face and a convex face, and wherein the concave face faces the first end of the bushing and the convex face faces the composite ring seal.

11. A variable turbine geometry (VTG) turbocharger, comprising:
    a turbine section having a turbine wheel and a plurality of guide vanes surrounding the turbine wheel, the plurality of guide vanes being configured to regulate a flow of exhaust gases to the turbine wheel by opening and closing;

a compressor section;

a bearing section between the turbine section and the compressor section;

an actuation pivot shaft (APS) connected to an actuator and configured to mediate actuation of the opening and closing of the plurality of guide vanes, the APS including a bearing side in the bearing section and a pressure side in the turbine section;

a bushing rotatably supporting the APS with a clearance therebetween, the bushing extending from a first end at the pressure side to a second end at the bearing side; and a face seal assembly configured to seal a leakage of the exhaust gases through the clearance between the bushing and the APS, the face seal assembly comprising:

a cup spring circumscribing the APS at the pressure side, the cup spring forming a first face seal with the first end of the bushing, the cup spring extending from a radially inward edge to a radially outward edge, the radially outward edge of the cup spring contacting the first end of the bushing;

a composite ring seal circumscribing the APS adjacent to the cup spring and forming a second face seal with the cup spring, the cup spring and the composite ring seal relatively rotatable to the APS and the bushing; and a spring circumscribing the APS at the bearing side and engaging the second end of the bushing.

12. The VTG turbocharger of claim 11, wherein the composite ring seal is positioned between the cup spring and a mating structure, wherein the mating structure is one of a mating ring and a head of the APS, and wherein the composite ring seal forms the second face seal with both the cup spring and the mating structure.

13. The VTG turbocharger of claim 12, wherein the mating structure is the mating ring engaged between the composite ring seal and the head of the APS, and wherein the mating ring forms an interference fit with the APS.

14. The VTG turbocharger of claim 12, wherein the mating structure is the head of the APS.

15. The VTG turbocharger of claim 11, wherein cup spring includes a concave face and a convex face, and wherein the concave face faces the first end of the bushing and the convex face faces the composite ring seal.

16. The VTG turbocharger of claim 15, wherein the cup spring is formed from one of a nickel alloy and a cobalt alloy.

17. The VTG turbocharger of claim 16, wherein the composite ring seal is formed from a graphite composite.

18. A method of assembling a face seal assembly of a variable turbine geometry (VTG) turbocharger, the face seal assembly being configured to seal a leakage of exhaust gases between an actuation pivot shaft (APS) and a bushing rotatably supporting the APS, the APS having a shaft portion connected to an actuator and a head end, the head end of the APS penetrating the turbine section of the VTG turbocharger, the method comprising:

assembling a composite ring seal on the shaft portion of the APS near the head end and adjacent to a mating structure, the mating structure being one of a mating ring and a head of the APS;

inserting a cup spring over the shaft portion of the APS adjacent to the composite ring seal, the cup spring extending from a radially inward edge to a radially outward edge, the cup spring and the composite ring seal relatively rotatable to the shaft portion and the bushing;

installing the shaft portion of the APS in the bushing so that a first end of the bushing faces the cup spring and is oriented toward the turbine section;

assembling a spring on the shaft portion of the APS adjacent to a second end of the bushing;

fastening a retaining structure on the shaft portion of the APS adjacent to the spring so that the retaining structure engages the spring, the fastening forming a first face seal between the first end of the bushing and the cup spring such that the radially outward edge of the cup spring contacts the first end of the bushing, the fastening further forming a second face seal between the cup spring and the composite ring seal, the retaining structure being one of a retaining ring and a lever assembled on the shaft portion, wherein the lever is configured to transfer torque from the actuator to the APS.

19. The method of claim 18, wherein fastening the retaining structure on the shaft portion of the APS comprises holding the spring and the cup spring in compression.

* * * * *